Nov. 1, 1960  J. B. WILSON  2,958,266
APPARATUS FOR PRODUCING STRENGTHENED CONTAINERS
WITH METALLIC LINERS THEREIN
Filed Oct. 10, 1957  6 Sheets—Sheet 1

INVENTOR.
JOHN B. WILSON
BY Glenn & Jackson
ATTORNEYS

Nov. 1, 1960   J. B. WILSON   2,958,266
APPARATUS FOR PRODUCING STRENGTHENED CONTAINERS
WITH METALLIC LINERS THEREIN
Filed Oct. 10, 1957   6 Sheets-Sheet 4

INVENTOR.
JOHN B. WILSON
BY Glenn & Jackson
ATTORNEYS

FIG. 12

Nov. 1, 1960  J. B. WILSON  2,958,266
APPARATUS FOR PRODUCING STRENGTHENED CONTAINERS
WITH METALLIC LINERS THEREIN
Filed Oct. 10, 1957  6 Sheets-Sheet 6

*INVENTOR.*
JOHN B. WILSON

BY *Glenn & Jackson*
ATTORNEYS

United States Patent Office 2,958,266
Patented Nov. 1, 1960

2,958,266
APPARATUS FOR PRODUCING STRENGTH-
ENED CONTAINERS WITH METALLIC LINERS
THEREIN

John B. Wilson, Louisville, Ky., assignor to Reynolds
Metals Company, Richmond, Va., a corporation of
Delaware Filed Oct. 10, 1957, Ser. No. 689,298

7 Claims. (Cl. 93—36.01)

This invention relates to the production of strengthened containers having heat-sealed metallic liners therein and, more specially, to an improved apparatus for producing such containers by the employment of a heated expansible mandrel.

In particular, the invention relates to an apparatus for producing strengthened lined containers wherein a preformed, inherently sealed metallic liner is securely sealed by a separate operation into a preformed container in contrast with a single sealing wherein the liner is simultaneously sealed to itself and to the container.

While various forms of apparatus have been employed heretofore for the heat-sealing of particular non-metallic liners to the interior of containers by employment of both heat and pressure, difficulty had been encountered when attempting to use such apparatus for securing metallic liners in those containers. Such difficulties frequently include galling of the thin metallic surface when removed from pressure contact with a heated metallic mandrel, the non-uniformity of the seal of the liner to itself, or of the liner to the container wall, and the wrinkling of the liner during the sealing operation. It is these and similar disadvantages of the known procedures which it is a purpose of my invention to overcome.

An object of the invention is to provide an improved apparatus for securing a metallic liner to a container including the separate steps of forming an inherently sealed liner preform and the sealing of that preform to the container.

Another object is to provide an improved expansible mandrel adapted for jointly shaping an inherently sealed liner preform while in contracted condition and for sealing that preform to a container while in expanded condition.

A further object is to provide an improved apparatus for simultaneously folding and initially sealing a metallic liner preform while in position upon a mandrel.

A further object is to provide an improved apparatus for removing a heated mandrel from contact with a lined container while cooling the lining of that container and without damage to the surface of the lining.

Still a further object is to provide a strengthened container having a metallic liner therein and with the liner sealed to itself and to the container in an improved manner whereby the liner better resists bulging stresses and shocks during handling of a filled container.

The features of my invention which I believe to be novel, are pointed out with particularity in the appended claims. My invention itself, however, may be best understood by reference to the following description taken in conjunction with the accompanying drawings in which:

Figure 2:
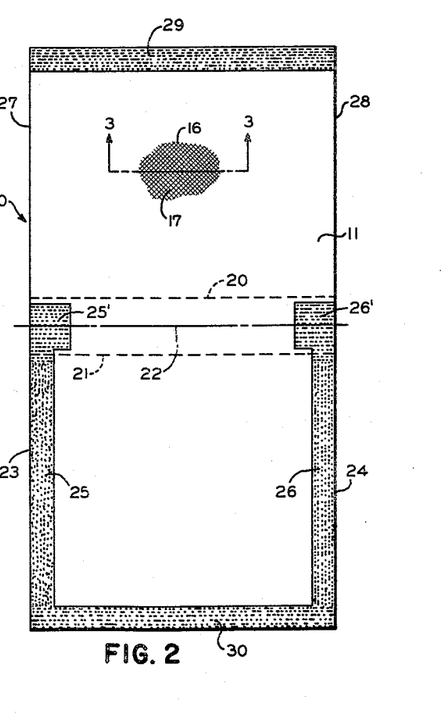
Fig. 2 is a plan view of the metallic liner in developed form with a portion of the line-embedded metallic foil being shown.
Figure 3:
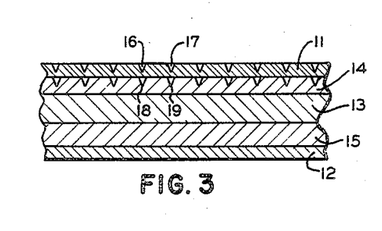
Fig. 3 is a sectional view on line 3—3 of Fig. 2 and to a greatly enlarged scale.

In accordance with my invention, I effect the lining of a container by a series of operational steps conducted in a prescribed sequence which results in the production of an inherently sealed preformed liner and the subsequent sealing of that liner to the interior surface of the container. These steps may be conducted in whole or in part by either manually or automatically actuated apparatus, preferably by high speed packaging apparatus. The liner itself preferably comprises a laminated sheet having a metallic foil surface arranged for contact with the contents later to be added to the container and with a backing lamination arranged for secure sealing to the inner surface of the container. The sealing of the preformed liner to the container, moreover, employs heat and pressure which are applied by an improved expansible mandrel. The mandrel construction and actuation is such as to permit the application of substantial pressure to the liner without galling or wrinkling of that liner and this desirable objective is secured in part by the line-embedded nature of the foil surface in contact with the improved mandrel. Furthermore, the improved apparatus for lining containers is adapted for use with known packaging machines without requiring more than minor mechanical modifications of the same, While the invention, in its broader aspects, is adapted for heat-sealing non-metallic liners or liners of various metallic materials to containers, I prefer to employ the improved liner material disclosed more fully in the copending application of Raymond E. Jacke, Serial No. 638,016, filed February 4, 1957, and assigned to the same assignee as the present invention. Referring now to Figs. 2 and 3, the liner sheet designated generally at 10 preferably comprises a rectangular shaped, laminated member having on one side a thin sheet 11 of metallic foil, preferably aluminum, and on the other side a somewhat thicker sheet 12 of a porous material, such as tissue paper. A centrally located sheet 13 of a material impervious to heated wax and comprising, for example, flexible paper or plastic film, is disposed between sheets 11 and 12. On the sides of the central sheet 13, two spaced layers 14 and 15 of a heat sealing composition, such as microcrystalline wax, are provided, thus forming the sheet into a five layered, or laminated, structure. Accordingly, when heat is applied to the liner by any suitable instrumentality, such as an electrically heated plate or mandrel, the wax layers tend to flow, but, due to the presence of the wax impervious layer, the direction of flow or migration is controlled and takes place in an outward direction.

Due to the different coefficients of expansion of the several materials comprising the liner, and due to the tendency of the thin metallic sheet 11 to be abraded or galled by moving contact with a metallic mandrel, I prefer to employ the line-embedded feature shown in the Jacke application in connection with my liner 10. For example, a series of closely spaced parallel small grooves 16 are formed in one direction across the entire outer surface of the metallic sheet 11, these grooves being intersected by a similar series of grooves 17 at a suitable intersecting angle thereto. As the respective grooves 16 and 17 are formed, companion projections 18 and 19 are extruded on the lower side of sheet 11, these projections being embedded in the material comprising layer 14. The formation of the groove may be readily made, for example, by pressing the sheet 11 against a knurled die prior to incorporation of the sheet into the remainder of the liner. A line-embedding or scoring pattern of diamond shaped configuration is preferred, although other geometric patterns may be used.

As a result of the minute surface air channels thus provided in the outer surface of the metallic sheet 11, good slipping characteristics are found when the mandrel later to be described, expands and contracts during the sealing operation in contact with sheet 11. Moreover, expansion of the metallic sheet due to heating applied by that mandrel, can take place without warping or wrinkling the surface of the sheet as a whole.

As will later appear, the wax which migrates through tissue layer 12 is intended primarily to adhere to the inner surface of the container, but for sealing the side edges and tabs of the liner 10 to each other in an improved manner during the forming of the inherently sealed liner preform, I provide an arrangement for permitting the passage of wax through an otherwise impervious metallic layer.

As best seen in Fig. 2, the rectangular liner member 10 is adapted to be creased by the mandrel along fold lines 20 and 21 equally spaced from transverse center line 22. Along opposite side edges 23 and 24 to one side of the center line, lightly punctured sealing bands 25 and 26 of perforations are provided in metallic layer 11, these bands extending somewhat beyond the center line 22, but not so far as the fold line 20. However, along side edges 27 and 28 on the other side of the fold line 20, the metallic layer is unperforated. Perforated bands 29 and 30 are provided at the extreme ends of the liner member for the purpose of later sealing the filled container, but this feature forms no essential part of my invention. As disclosed in the Jacke application, the perforated bands may conveniently be formed by passing over the metallic layer 11 a suitable abrading means such as a rouletting wheel, or roller covered with emery cloth, or the like, while under sufficient pressure to form a series of spaced pin-holes of sufficient size to permit heated wax to exude therethrough for sealing purposes. It will be understood that the described pattern of perforated bands may be formed upon a long strip of liner material prior to coiling the same for web feeding purposes upon a packaging apparatus, or may be formed by passage of an unperforated web of material across the abrading means mounted in such apparatus and prior to severing of the separate liner members from the web.

In carrying out the several steps of my invention, as will later be specifically described, any conventional apparatus for feeding the above described liner material to a movable mandrel station; for feeding a preformed container open at one end to the same mandrel station; and for removing the lined container from that mandrel station, may be employed. An apparatus particularly suited for this purpose is described in detail in Everett Patent 1,543,374, issued June 23, 1925.

Figure 4:
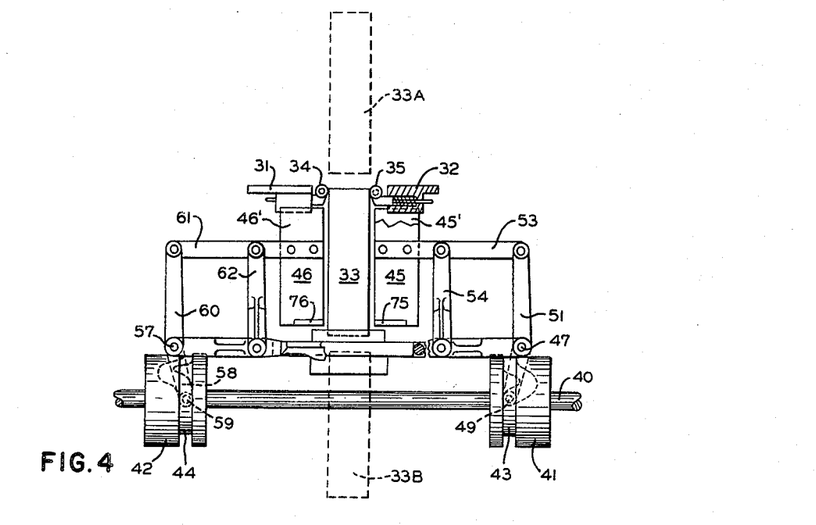
Fig. 4 is a detail view in end elevation of a folding mechanism for positioning the edges of the liner against the shaping mandrel.
Figure 5:
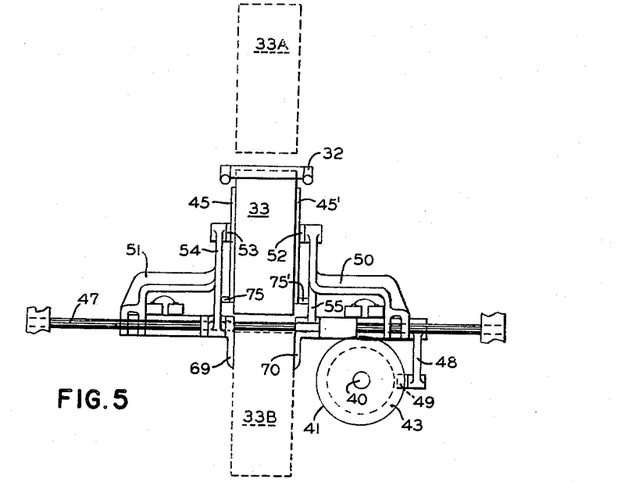
Fig. 5 is a detail view in front elevation of the folding mechanism of Fig. 4.
Figure 6:
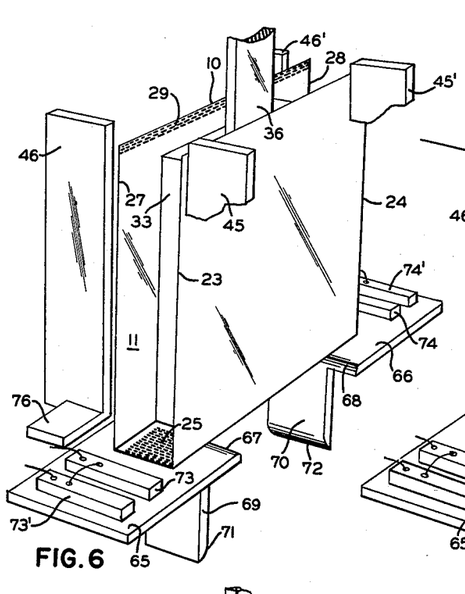
Fig. 6 is a perspective view of a portion of the folding mechanism and showing the mandrel at rest in position for the step of folding of the first edges of the liner.

Referring now to Figs. 4 and 5, as the Everett type machine feeds the liner sheet 10, severed from the web of liner material and with its metallic surface 11 in position for contact with the descending mandrel, the sheet is initially positioned above stationary supporting plates 31 and 32. These plates are spaced apart sufficiently to permit mandrel 33 to move from one extreme position indicated at 33A to another extreme position indicated at 33B. As the mandrel descends it carries the liner sheet 10 between yieldingly mounted presser rolls 34 and 35, which operate to shape the liner sheet around two opposed sides of mandrel 33 and to hold it against those sides as best seen in Fig. 6 and as charted at Fig. 1(A). At this time, the respective edges and abraded bands of the liner sheet are located as shown in Fig. 6. The mandrel 33 is actuated by a suitable rod 36 secured at one end to a mandrel shoe, later to be described, and at its other end to an actuating cam (not shown) driven by the Everett type machine and having a dwell portion thereon.

Figure 1:
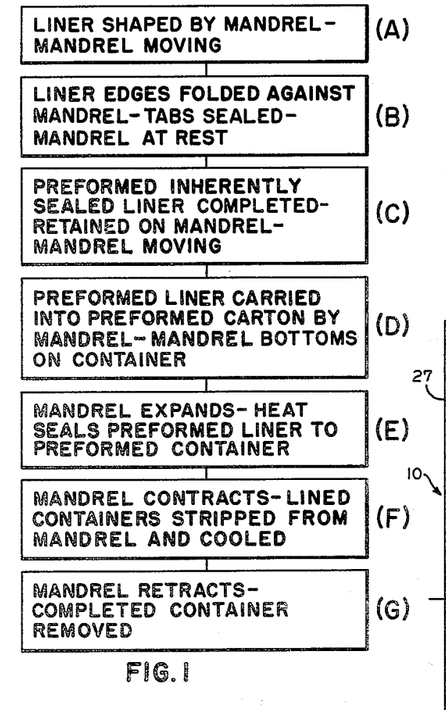
Fig. 1 is a descriptive chart showing by legends the succesive steps of my improved method of lining a container.

After the mandrel 33 has moved to the position shown in solid lines in Figs. 4, 5 and 6, it remains at rest, due to the dwell portion of its actuating cam at which time the step charted at Fig. 1(B) is accomplished. During this phase of operation, a drive shaft 40 of the Everett type machine is operable to rotate spaced cams 41 and 42 having cam grooves 43 and 44, respectively. Mounted adjacent the mandrel 33 at its described position of rest, are two pairs of folder plates 45, 45' and 46, 46', arranged for movement inwardly and downwardly along the spaced side walls of the mandrel. These plates are actuated as pairs in sequence, one pair remaining retracted, while the other pair is moving through its folding cycle. Moreover, these pairs of plates are provided at their lower ends with transversely extending flat sealing feet, the feet for plates 45, 45' being shown at 75, 75' and the foot for plate 46 being shown at 76.

For the purpose of affording timed movement of folder plates 45, 45', a rock shaft 47 mounted in a stationary framework and having an arm 48 fixed to the shaft and carrying a roller 49 engaging in cam groove 43, is provided. Also attached to rock shaft 47 are spaced arms 50 and 51 pivotally attached to links 52 and 53, each of which is fixedly secured at its forward end to the respective folder plates 45' and 45. Intermediate their ends, links 52 and 53 are pivotally attached to one end of links 54 and 55 which are pivotally mounted at their other ends upon the stationary framework, thus providing a pantograph linkage for each of the folder plates. Thus, upon rotation of cam 41, these linkages act to move folder plates 45, 45' inwardly along the end walls of the mandrel and downwardly toward the bottom edge of those end walls. Further rotation of cam 41 then serves to retract the plates 45, 45' to their original position.

In a similar fashion, a rock shaft 57 having an arm 58 fixed thereon and carrying a roller 59 engaging in cam groove 44, is provided. Also affixed to rock shaft 57 are a pair of spaced arms (one being shown at 60) pivotally attached to spaced links (one being shown at 61), each of which is fixedly secured at its forward end to the respective folder plates 46, 46'. Intermediate their ends, these links are pivotally attached to one end of a pair of intermediate links (one being shown at 62), the other ends of which are pivotally mounted upon the stationary framework to provide pantograph linkages. Thus, upon rotation of cam 42, whose groove 44 is arranged differently from the groove 43 of cam 41, the linkage acts to move folder plates 46, 46' inwardly along the end walls of the mandrel and downwardly toward the bottom edge of those end walls. Further rotation of cam 42 then serves to retract plates 46, 46' to their original position.

Passing now to Fig. 6, it will be noted that a pair of spaced platforms having flat top portions 65 and 66 joined by rounded edges 67 and 68 to flat, smooth, parallel downwardly extending leg portions 69 and 70, are mounted with the top portions preferably lying in substantially the same plane as the bottom of mandrel 33, while at the described position of rest. At their extreme lower ends the leg portions are provided with inwardly curved surfaces 71 and 72. These leg portions are spaced apart at a distance corresponding to the dimension of contracted mandrel 33 plus the thickness of the sealed liner positioned on that mandrel. In carrying out my improved method of lining with the described apparatus, I also provide suitable heating units 73 and 74 for the respective platforms. These heating units may be controlled in any suitable manner, preferably with thermostatic controls 73' and 74', and serve to heat the top and leg portions of those platforms to an extent sufficient to melt the wax layers 14 and 15 of the liner brought into contact therewith. Normally, a temperature of about 350° F. suffices for this purpose.

Figure 7:
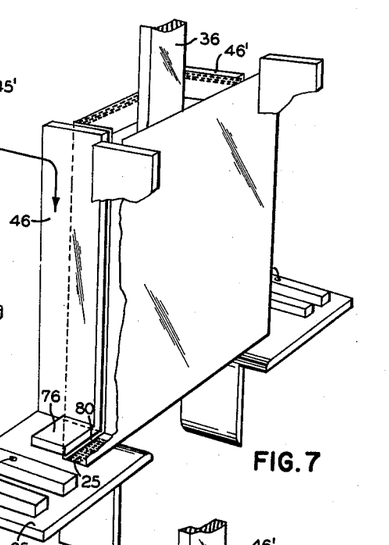
Fig. 7 is a perspective view of a portion of the folding mechanism and showing the mandrel at rest with the folding of the first edges of the liner completed and with certain tab portions thereof inherently sealed.

With the mandrel 33 at rest, as seen in Fig. 6, and with the shaped liner held in contact therewith by the resiliently mounted rollers 34, 35 (Fig. 4), and spring presser plates (not shown), cam 42 acts to move folder plates 46 and 46' in the direction of the arrow shown in Fig. 7. As this occurs, the unabraded edges 27 and 28 of the liner are folded inwardly against the contracted mandrel and triangular tabs, one being shown at 80 and comprising a double thickness of the liner, are formed at the lower edge portion of edge 27. Since the movement of foot 76 of folding plate 46 lightly presses the bottom surface of tab 80 against the heated platform 65, the wax in layer 14 of the folded liner is sufficiently heated to exude through perforations in foil layer 11 at abraded portion 25', a similar action also occurring in connection with the companion folding plate 46', thereby sealing the two thicknesses of the triangular tab together.

Figure 8:
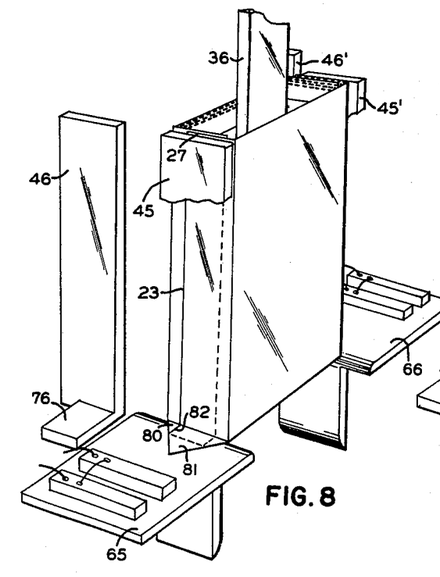
Fig. 8 is a perspective view of a portion of the folding mechanism with the mandrel at rest and with the folding of the second edges of the liner completed and with certain tab portions thereof inherently sealed, portions of the folding mechanism being broken away for purposes of clarity.
Figure 9:
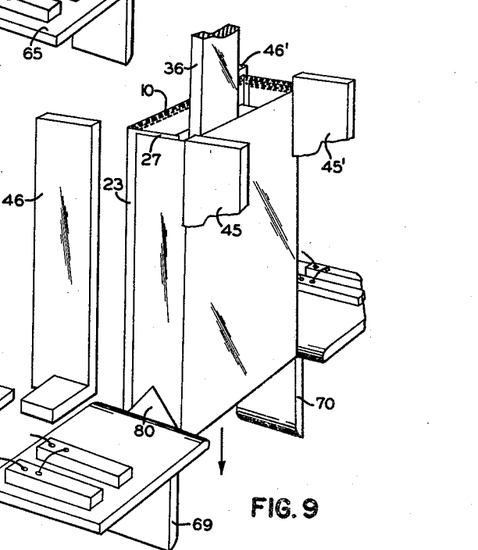
Fig. 9 is a perspective view showing the folding mechanism retracted and with the mandrel starting to move for the purpose of completing the inherent sealing of the liner preform.

Following this initial folding, plates 46, 46' retract and cam 43 acts to move folder plates 45, 45' into the position shown in Fig. 8. As plates 45, 45' move forwardly, the edges 23, 24 of the liner 10 are folded in overlapping relation upon edges 27, 28, respectively, of the same liner, and the abraded bands 25 and 26 are brought into contact with the layer 12 of the liner portions overlapped thereby. Moreover, as plates 45, 45' move downwardly with their sealing feet 75, 75', they also form triangular-shaped tabs, one being shown at 81 and comprising a multiple thickness of the liner with the different layers sealed to one another, in a similar manner as described above. As the newly formed tab 81 is folded into contact with the earlier formed tab 80, being completely overlapped to the right of line 82 (seen in Fig. 8) a reinforced junction of the sides of the liner is formed, comprising four layers of liner material at part of the junction and three layers of liner material supplemented by the abraded band 25 at another portion of the junction. Thus, as the sealing feet 75 and 75' press the tabs 80 and 81 against the heated platforms 65 and 66, wax passing between adjacent layers at those tab junctions serves to bond the liner in an inherently sealed condition at such junctions. It will be understood, however, that at this time, the overlapping edges of the liner extending above such tabs are unsealed. This includes the step of operation indicated at Fig. 1(B). Folder blades 45 and 45' are shown retracted in Fig. 9 so as to enable a better view of the initial downward movement of the shaped liner. Preferably, folder blades 45 and 45' are not retracted until the actuating cam of the Everett type machine acts upon mandrel rod 36 to move the mandrel and the shaped liner positioned thereon, downwardly between and in contact with the heated leg portions 69 and 70 of the stationary platforms. Since the folder blades are springbiased, the tabs 80 and 81 are readily pulled from underneath sealing feet 75 and 75' during the downward movement. During the downward movement, the uppermost layer 12 of the tab 81 is forced against the outer layer 12 of the side edge 23 of the liner and is bonded thereto. Simultaneously, the inner layer 11 of the side edge 23 of the liner is forced against the outer layer 12 of the side edge 27 of the liner and since abraded band 25 extends along the entire distance of this overlapping, wax passing through the pinholes of that band serves to securely bond these side edges of the liner together. A similar action occurs along the companion edges 24 and 28 of the same liner. This sealing action is accomplished without damage to the layer 12 of the liner, since that layer is now covered with heated wax and slips easily over the rounded edges 67, 68 of the platforms as the mandrel moves downwardly. When mandrel 33 has moved downwardly sufficiently to clear the legs 69 and 70, folder blades 45 and 45' are retracted and a securely and inherently sealed liner preform, located in position upon the mandrel, is available for further use. At this time, the step indicated at Fig. 1(C) is completed. Tests have shown that the liner produced at this stage of my method is capable of withstanding substantial bulging pressures, is leakproof, and is substantially wrinkle-free, thus indicating the magnitude of the inherent sealing contained thereby. While such a liner could be employed without further sealing within a container as a separate member, I prefer to seal the liner to the container. In carrying out this supplementary sealing action, an expansible mandrel 33, as best seen in Figs. 12 and 13, may conveniently be employed.

As shown, four complementary shell members 85, 86, 87 and 88 are provided and are arranged in assembled contracted position to form a right-parallelepiped configuration. Each shell member is formed with an interior recess having sloping interior walls extending from a maximum width adjacent the top of the mandrel to a minimum width adjacent the bottom of the mandrel. As seen in Figs. 14 to 17, the shell member 85 has one such sloping wall 89 and a second sloping wall 90 transversely thereof. The other shell members are provided with corresponding sloping walls of the same gradient. For example, one such wall of shell member 86 is seen at 91; a sloping wall of shell member 87 is seen at 92; a sloping wall of shell member 88 is seen at 93; and a similar sloping wall of shell member 87 is seen at 94.

Each shell member is cut away at its top ledge above said recess to receive a rectangular shaped rod 36 serving as the actuating means for the expansible mandrel. In addition, one shell member here shown as member 88, is provided with an aperture through which a conduit 95 is adapted to slide. Rigidly joined to rod 36 as by soldering or the like, is a mandrel-sizing member, such as a shoe 96. This shoe is provided with sloping sides 97, 98, 99 and 100, as well as with a flat bottom surface 101 and a flat top surface 102. The length of the shoe is less than the length of the internal recess within the mandrel shells, thus resulting in a space 103 beneath the shoe when the mandrel is fully contracted. As an illustration, this space may have a depth dimension of about 0.500 inch when used on apparatus for forming 8 oz. and 16 oz. containers. Similarly, the overall widths of the shell members of the shoe, are varied, depending upon the size of container to be sealed, but in any event, the amount of expansion and contraction of the mandrel and the stroke of the shoe 96 preferably remains the same, regardless of the size of that container. Thus, different sizes of containers may be used in my method without requiring basic modification of the Everett type of machine which actuates the rod 36.

Figure 12:
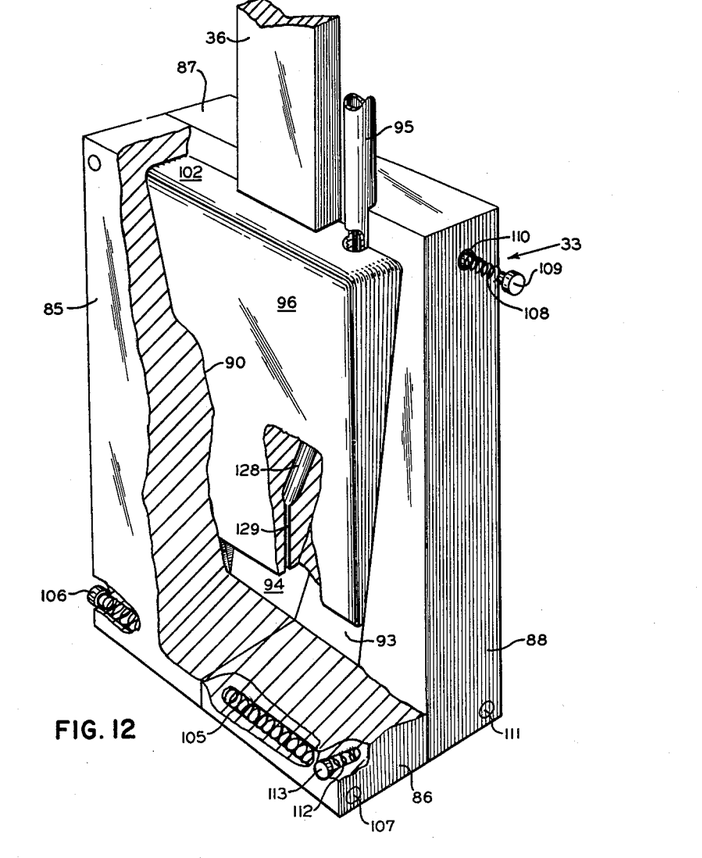
Fig. 12 is a perspective view of the expansible mandrel to a larger scale, and with portions broken away.
Figures 13, 18:
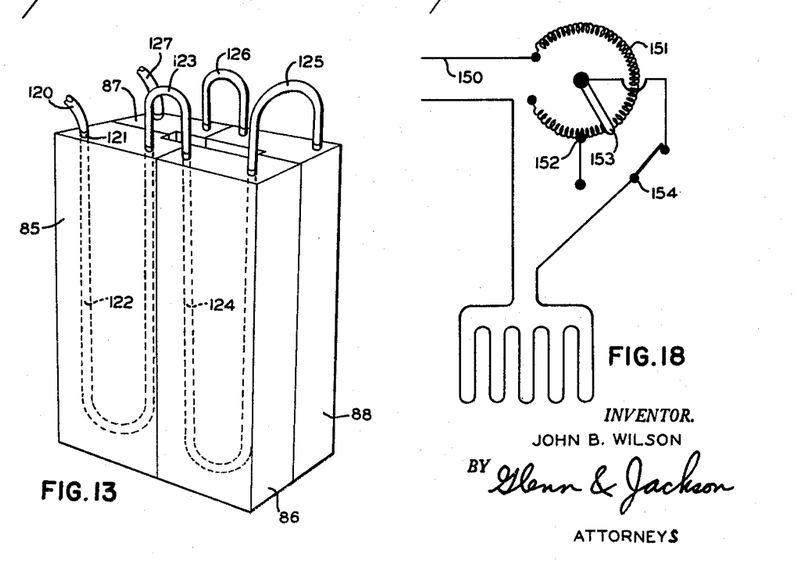
Fig. 13 is a perspective view of the assembled expanding shell portions of the mandrel diagrammatically showing the electrical heating units.
Fig. 18 is a circuit showing the variable voltage control.

As will be apparent, when that rod is driven downwardly, as seen in Fig. 12, the coaction of the sloping sides of the shoe with the sloping sides of the shell members separates those shell members from each other. In general, a separation of about 0.069 inch in each of the two planes, shown in Figs. 14 to 17, suffices to permit the improved sealing of the preformed liner to the preformed container, as will later be described. For the purpose of holding the several shell members in assembled relation at all times, I provide pairs of resilient retaining means in each of the shell members for coaction with each of its abutting shell members. As best seen in Fig. 12, each of these retaining means comprises an elongated tensioned spring anchored at its ends in spring clips which fit into recessed holes in the outer surfaces of the shell members. For example, adjacent their bottom portions, the shell members 85 and 86 are provided with a bore within which spring 105 is mounted. This spring is attached at one end to a clip 106 fitting in a recess in shell member 85 and at its other end to a clip 107 fitting in a similar recess in shell member 86. The outer surfaces of the spring clips form a smooth continuation of the outer surface of the shell members and after the spring is attached and set into place with the proper tension, the clips may be sweat-soldered into the recesses. It will be understood that all springs are mounted under a sufficient tension to hold the shell members in abutting relation while the shoe 96 occupies its uppermost position and to return such members to abutting relation when that shoe is retracted to such uppermost position after having made a downward stroke.

In addition to the illustrative example of spring 105, the shell members 85 and 86 are provided with a similar spring means (not shown) adjacent their upper portions and above the recess in those shell members. Likewise, shell members 87 and 88 are provided with similar tension springs, one being shown in exploded form at 108 and having a clip 109 for engagement in recessed hole 110. The clip 111 for the companion spring is seen at the bottom of shell member 88.

Cooperating with the described springs are a plurality of other springs adapted respectively to hold shell members 85 and 87 in assembled relation, as well as shell members 86 and 88 in assembled relation. One such spring 112, attached to clip 113 near the bottom of shell member 86, illustrates this arrangement.

As a feature of the invention, I provide means for selectively heating the several shell portions of the mandrel. As seen in Fig. 13, the mandrel is shown in assembled relation with the actuating rod removed. Leading into shell member 85 is a flexible electrical conductor 120 which may fit within a tube 121 extending into a recess within the shell member adjacent the outer surface of the same and serving to prevent flexing of the conductor from being transmitted to the heating element. Embedded within a groove formed in the surface of shell member 85 is a suitable looped resistance cable 122 attached at its ends to conductor 120 and to a flexible jumper 123. This jumper connects with a similar resistance cable 124 in shell 86, and by means of jumpers 125 and 126 similar resistance cables in shells 88 and 87 are connected in series with the return conductor 127, thus to provide a circuit through the mandrel. The flexible conductors and jumpers thus permit expansion and contraction of the mandrel without stressing the resistance cables embedded within the shell members. In assembling the mandrel heating means, the resistance cables are emplaced in the grooves and then embedded by filling the grooves with a suitable solder which is levelled to provide a smooth external surface on the shell exterior. Normally, the mandrel shell members are formed of brass providing a good heat transfer and a relatively low coefficient of friction with the metallic layer 11 of the liner material. It will be understood that relatively low temperatures, when combined with the mechanical pressure, exerted by the expanding mandrel, will suffice to bond the preformed liner to the preformed container. In general, a temperature of about 225° F. is sufficient and the resistance cables are so chosen, a cable of about 0.135 inch outside diameter and with about one ohm per foot being satisfactory. Any conventional arrangement for supplying suitable electrical current to conductors 120 and 127 may be employed, however, I prefer to use a variable voltage control as shown in Fig. 18. This control has 110 volt A.C. power source 150, a variable rheostat 151 with a fixed tap 152 and a variable tap 153. When the machine is not running, the switch 154 completes the circuit to the heating elements through fixed tap 152 which is at a relatively low voltage and keeps the heating elements at the correct temperature on a standby basis. When the machine clutch is engaged the switch 154 is moved either mechanically or by a solenoid from fixed tap 152 to variable tap 153 which keeps the heating elements at approximately the same temperature as before and supplies the additional heat needed to offset that being withdrawn by the heat-sealing of the liners to the cartons.

Referring now to Fig. 12, a hollow conduit 95 is rigidly attached to the top of the mandrel shoe and is guided for sliding movement in a suitable groove in the inner face of shell member 88. At its upper end, the conduit 95 is provided with a sliding, spring-biased coupling (not shown) for connection to a nipple on a suitable air pressure line. Extending into conduit 95 is a bore 128 formed in the mandrel shoe and terminating at the lower surface 101 of that shoe by means of the bore continuation 129. By means of any conventional air supply source attached to the Everett type machine and suitably actuated in dependence upon the movement of the mandrel 33, air may be controllably supplied under pressure for stripping the lined container from contact with the mandrel at the conclusion of the lining operation. Moreover, such air, which is cooler than the temperature of both that mandrel and the metallic liner, serves to cool the liner container. It will be understood that air under pressure is supplied to conduit 95 only when the stripping action is being conducted.

Figures 10, 11:
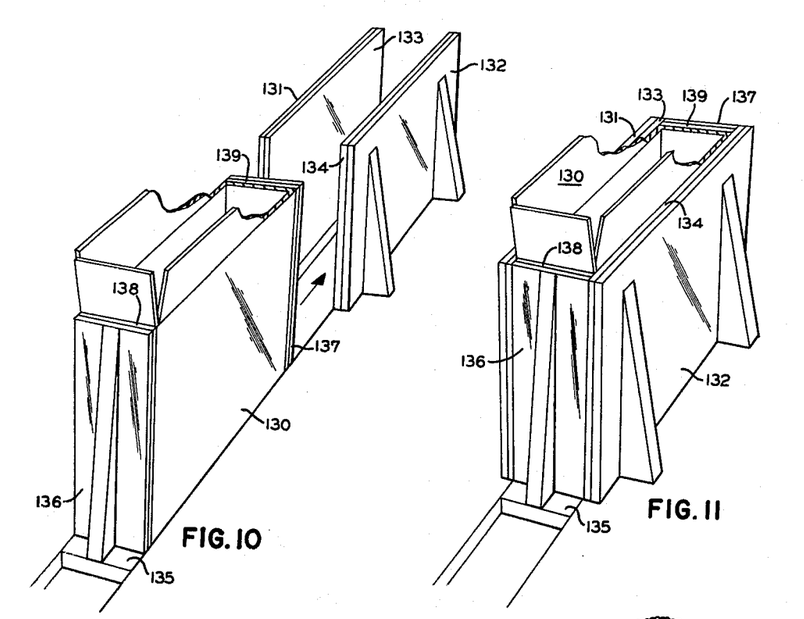
Fig. 10 is a perspective view of the preformed, unlined container in position within a portion of the disassembled mold structure.
Fig. 11 is a perspective view of the preformed, unlined container in position within the assembled mold structure.

Considering now Figs. 10 and 11, the Everett type of machine used with my invention, may conveniently employ the same type of container transfer mechanism, as shown in that patent. Preformed unlined containers, as shown at 130, having an open top with flaps for closing of that top after filling of the container, are fed in succession by means of a conveyor belt into a ready position spaced from the mandrel sealing position. Mounted upon the machine framework is a pair of stationary, parallel, mold side walls 131 and 132 spaced apart at a distance corresponding to the end dimension of the container and adapted to receive the mandrel 33 therebetween. These mold walls are suitably reinforced for withstanding the pressure exerted by the expansible mandrel and may be covered with a backing layer of resilient material, such as neoprene rubber, and shown at 133, 134.

Reciprocable between the mold side walls is a slide 135 having a flat bottom portion and parallel reinforced mold end walls 136 and 137 mounted thereon and spaced apart at a distance corresponding to the larger side dimension of the container. These end walls likewise may be provided with a backing layer of neoprene, as shown at 138 and 139. The movement of slide 135 is coordinated in sequence with the movement of mandrel 33 and in accordance with the teaching of the Everett patent, operates as follows:

Unlined containers are supplied by a conveyor belt to a position alongside the slide 135, shown in Fig. 10. A pusher member, not shown, moves an unlined container against a lined container positioned between mold end walls 136 and 137 and displaces that lined container to the left as seen in Fig. 10, whereupon it may be removed by another conveyor. The unlined container upon being positioned between mold end walls 136 and 137 is carried by slide 135 into position beneath the mandrel, at which time the mold structure is assembled by the then positioned slide member forming a floor and the side and end walls 131, 132, 136 and 137 forming a completed boundary for the container sides, as seen in Fig. 11. With the unlined container in this ready position, the following operation of the mandrel is conducted, it being understood that, at this time, the step shown at Fig. 1(D) has been completed and the previously described inherently sealed liner preform is in position on that mandrel.

Figure 14:
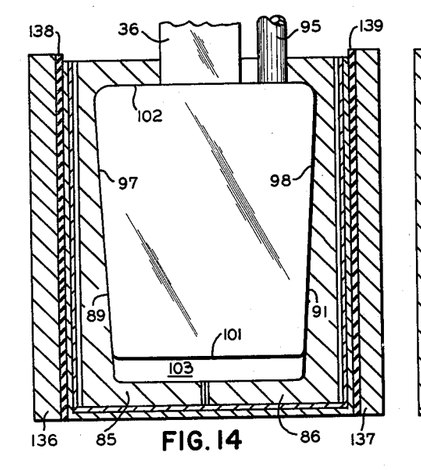
Fig. 14 is a sectional view of the mandrel in place within the preformed liner and container, and positioned in the assembled mold at the beginning of the sealing of the liner to the container, the clearances within the mandrel being to an exaggerated scale.
Figure 15:
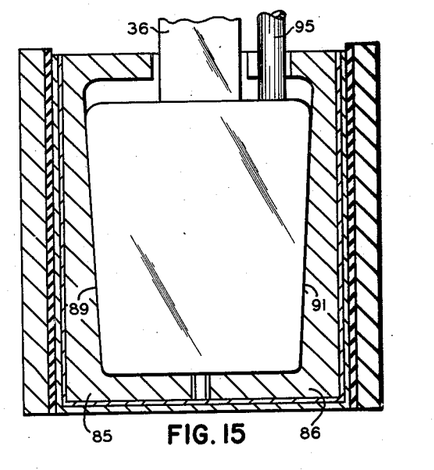
Fig. 15 is a view similar to Fig. 14 and showing the parts at the completion of the sealing operation.
Figure 16:
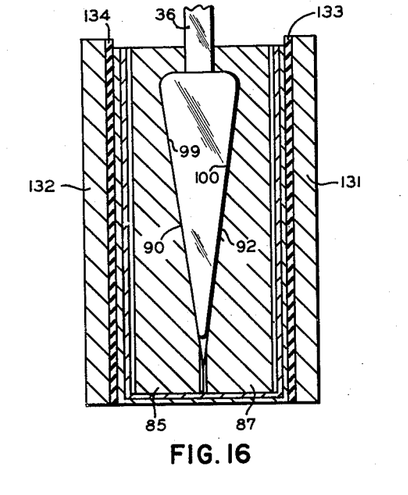
Fig. 16 is a sectional view similar to Fig. 14 and taken transversely thereof.
Figure 17:
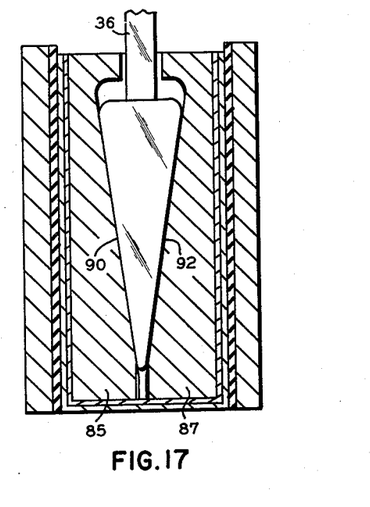
Fig. 17 is a sectional view similar to Fig. 15 and taken transversely thereof.

Upon downward movement of actuating rod 36, the mandrel reaches the position shown in Fig. 14 with the liner resting in contact with the container, both at its sides and bottom, and at this time the mandrel bottoms on the container and upon the slide supporting that container bottom. At this time, no air is being supplied to conduit 95 and the mandrel shell members are, of course, in their fully contracted positions. As the mandrel bottoms, the actuating rod 36 continues to move downwardly, being arranged for about 0.500 in further travel than the downward movement of the mandrel shell members. Movement of the rod then expands the mandrel as the sloping sides 97, 98, 99 and 100 of the same move along the corresponding inner sides of the several shell members. During this expansion, heat passes from the mandrel through the metallic layer 11 of the liner and through the layers 14, 13, 15 and 12 of that liner. This heat, of course, is sufficient to melt both wax layers 14 and 15, even though the temperature of the mandrel is relatively low. The presence of the wax impervious layer 13 assures the availability of sufficient wax, both for passage through paper layer 12 into contact with the interior surface of the container 130, and for maintaining sufficient wax to retain the seal formed between edges 23, 27 and 24, 28 of the already sealed liner preform. The tab portions of the liner preform with their triply and quadruply folded portions, likewise retain their inherently sealed condition. This distribution of the adhesive wax content further assures a strengthened container, since not only does the inherently sealed liner retain its strength, but also that liner is now securely sealed to the entire inner surface of the container.

As the mandrel expands, the line-embedded portions of the liner surface 11 may adjust themselves to expansion caused by heating and the minute air channels therein insure good slipping characteristics with respect to the moving mandrel surfaces. Thus, the inner layer 11 is ironed as the mandrel expands and no wrinkling or galling occurs. As will be apparent, each of the four mandrel shell members moves separately into its prescribed corner of the surrounding container during the mandrel expansion, thus providing a uniform and smooth ironing action on the liner surface. When the mandrel is fully expanded, the step indicated at Fig. 1(E) is concluded. Preferably, at this time, relatively cool air is supplied under pressure through conduit 95. Such air passes readily through mandrel passages 128 and 129 and through the cracks between the separated shell members and is effective to hold the lined container in position against the mold walls, as well as to cool that container rapidly. With this air pressure maintained, rod 36 begins its upward stroke and as the shoe 96 moves upwardly, the several tension spring act to contract the mandrel. As this occurs, the layer 11 of the liner loses contact with those shell members and the lined container is smoothly stripped from the mandrel at which time the step shown at Fig. 1(F) is concluded and the further supply of air through conduit 95 is interrupted when the moving mandrel is about ¾ of the way out of the formed carton.

Following upward movement of rod 36 for about 0.500 inch of travel, the top surface 102 of the shoe engages against the inner ledge surface of the shell member's tops and further movement of rod 36 retracts the entire mandrel in contracted form, the upward movement then continuing until the mandrel reaches position 33A, shown in Fig. 4, meanwhile being guided between the legs 69, 70 of the platform by means of the curved edges 71 and 72 of those legs. However, as the mandrel is moving upwardly, and as soon as its bottom surface clears the top of the now-lined container 130 (see Fig. 11) the Everett type machine is effective to move slide 135 to the left, thus disassembling the mold structure. Upon reaching the position of Fig. 10, the lined container is displaced from between mold end walls 136 and 137 and is removed, an unlined container meanwhile being substituted between those end walls. At this time, the final step, shown at Fig. 1(G) is completed and the apparatus is now in readiness for producing the next lined container.

The foregoing detailed description exemplifies a presently preferred apparatus for producing strengthened containers with liners therein. It will be apparent, however, to those skilled in the art, that various modifications can be made in the embodiment of the invention above described. Therefore, while I have shown a particular embodiment thereof, it will be understood that I do not wish to be limited thereto and I contemplate, by the appended claims, to cover any such modifications as fall within the true spirit and scope of my invention.

What I claim is:

1. In an apparatus for lining a preformed container having one closed end and four sides extending from that closed end, with a preformed inherently sealed liner having a metallic layer on a first surface, a wax-pervious layer on a second surface and a wax layer intermediate said first mentioned layers, said liner preform having one closed end and four sides extending from that closed end, the combination comprising an expansible mandrel having four laterally movable portions each having smooth side surfaces substantially parallel with the corresponding side portions of said container, said mandrel portions being adapted for contact with said metallic layer of said liner and for forcing the wax pervious layer of said liner into contact with the sides of said container, the bottom of said mandrel portions being smooth and adapted to force said closed end of said liner preform into contact with said closed end of said container, each of said four portions of said mandrel containing an integral corner surface between adjacent sides of said mandrel portion and movable simultaneously therewith, means for reciprocating said mandrel, sizing means for expanding and contracting said mandrel, a mold for enclosing said container about said mandrel during expansion thereof, means for shaping said liner about said mandrel while disposed in contracted form outside of said mold, means for heat bonding the edges of said liner to themselves during movement of said mandrel toward said mold thereby to dispose an inherently sealed liner preform carried by said mandrel within the container disposed in said mold, said mandrel-sizing means being actuated by said mandrel-reciprocating means upon positioning of said liner in said container, and means for actuating said liner-shaping means and said mandrel-reciprocating means in predetermined sequence.

2. Apparatus as defined in claim 1 including means carried by said mandrel for heating said metallic layer substantially uniformly during expansion of said mandrel whereby said heating causes wax from said wax layer to move through said wax-pervious layer into contact with said container and to form a strengthened bond between said liner and said container.

3. Apparatus as defined in claim 1 including means carried by said mandrel for cooling said mandrel and the lined container following the heating of said liner.

4. For use in heat-sealing a laminated, one-closed-end, liner preform having a metallic layer on a first surface, a wax-pervious layer on a second surface and a wax layer intermediate said first-mentioned layers, to a container having one closed end; an expansible mandrel having four inter-connected laterally movable portions each having smooth side surfaces substantially parallel with the corresponding side portions of said container and having an internal recess therein, said mandrel portions being adapted for contact with said metallic layer and for forcing the wax-pervious layer of said liner into contact with the sides of said container, the bottom of said mandrel portions being smooth and adapted to force the closed end of the liner preform into contact with the closed end of said container, each of said four portions of said mandrel containing an integral corner surface between adjacent sides of said mandrel portion and movable simultaneously therewith, mandrel-sizing means arranged within the recesses of said mandrel portions in contact with said mandrel portions at all times and movable between a first position in which said mandrel is contracted to minimum size and a second position in which said mandrel is expanded to maximum size, and means for actuating said mandrel-sizing means.

5. A mandrel as defined in claim 4 wherein said mandrel-sizing means includes a movable member having inclined surfaces in contact with inclined surfaces of said recesses and with an overall length in its direction of movement which is less than the overall length of said recesses.

6. A mandrel as defined in claim 4 wherein said mandrel portions are interconnected by springs maintained under tension thereby to cause said mandrel normally to assume its contracted size.

7. A mandrel as defined in claim 4 including means for supplying a stream of air under pressure into said mandrel in timed sequence with the operation of said mandrel-sizing means.

References Cited in the file of this patent

UNITED STATES PATENTS

| 1,186,498 | Regan | June 6, 1916 |
| 1,543,374 | Everett | June 23, 1925 |
| 1,858,706 | Gils | May 17, 1932 |
| 2,131,633 | Lindholm | Sept. 27, 1938 |
| 2,136,990 | Daller | Nov. 15, 1938 |
| 2,414,268 | Moran | Jan. 14, 1947 |
| 2,421,935 | Gosnell | June 10, 1947 |
| 2,438,981 | Waters | Apr. 6, 1948 |

FOREIGN PATENTS

| 490,298 | Canada | Feb. 3, 1953 |